United States Patent
Mizobuchi et al.

(10) Patent No.: US 7,512,164 B2
(45) Date of Patent: Mar. 31, 2009

(54) LASER DRIVE IC AND OPTICAL TRANSCEIVER USING SAME

(75) Inventors: Kenji Mizobuchi, Hitachi (JP); Izumi Fukasaku, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 243 days.

(21) Appl. No.: 11/151,274

(22) Filed: Jun. 14, 2005

(65) Prior Publication Data
US 2005/0276609 A1   Dec. 15, 2005

(30) Foreign Application Priority Data
Jun. 15, 2004 (JP) ............... 2004-176606
Feb. 21, 2005 (JP) ............... 2005-043787

(51) Int. Cl.
*H01S 3/00* (2006.01)

(52) U.S. Cl. ............. 372/38.09; 372/38.01; 372/38.02; 372/38.03; 372/38.07

(58) Field of Classification Search ............... 372/38.1, 372/38.01, 38.02, 38.07, 38.09, 29.011, 29.012, 372/29.015; 398/135–137
See application file for complete search history.

(56) References Cited

U.S. PATENT DOCUMENTS

| | | | |
|---|---|---|---|
| 4,837,787 A * | 6/1989 | Takesue et al. ............ 372/29.02 |
| 5,163,063 A * | 11/1992 | Yoshikawa et al. ........ 372/38.02 |
| 5,764,666 A * | 6/1998 | Wakabayashi et al. ... 372/38.09 |
| 6,160,647 A * | 12/2000 | Gilliland et al. ............... 398/23 |
| 6,480,314 B1 * | 11/2002 | Kobayashi ................... 398/192 |
| 6,711,189 B1 * | 3/2004 | Gilliland et al. .......... 372/38.02 |
| 6,795,656 B1 * | 9/2004 | Ikeuchi et al. ................ 398/197 |
| 6,798,990 B2 * | 9/2004 | Brown et al. ................... 398/15 |
| 2002/0093714 A1 * | 7/2002 | Tokita et al. ................. 359/187 |
| 2003/0138010 A1 * | 7/2003 | Herz ....................... 372/38.02 |
| 2006/0126246 A1 * | 6/2006 | Hussein et al. ............. 361/91.1 |

FOREIGN PATENT DOCUMENTS

JP   9-321386   12/1997

* cited by examiner

*Primary Examiner*—Minsun Harvey
*Assistant Examiner*—Joshua King
(74) *Attorney, Agent, or Firm*—McGinn IP Law Group, PLLC

(57) ABSTRACT

A laser driver IC has an RS flip-flop for latching a signal that indicates an event of fault detection, to output it as an internal fault signal, and a fault signal processing section for generating a disable signal for inactivating the driving function of the laser driver IC in response to output of the RS flip-flop. One of outputs of the fault signal processing section is connected to a fault signal output terminal linked to outside the laser driver IC.

10 Claims, 5 Drawing Sheets

LASER DRIVE IC AND OPTICAL TRANSCEIVER USING SAME

The present application is based on Japanese patent applications Nos. 2004-176606 and 2005-043787, the entire contents of which are incorporated herein by reference.

BACKGROUND OF THE INVENTION

1. Field of the Invention

The present invention relates to an optical transceiver used in transmitting/receiving optical signals and particularly, to a laser driver IC capable of meeting a variety of specifications without increasing the number of terminals, and an optical transceiver using the laser driver IC.

2. Description of the Related Art

Optical transceivers used in transmitting/receiving optical signals in optical communications are typically detachably mounted to bodies of communication devices. Inside the optical transceivers, there are provided a light-receiving element used for receiving light signals, a circuit for amplifying its received light signals, a light-emitting element used for transmitting light signals, and a drive circuit for driving that light-emitting element with transmitted signals. It is desirable that the optical transceivers have a function of diagnosing faults regarding a laser that is a light-emitting element and a circuit for driving the laser, to force its driving to stop, and a function of indicating faults to a communication device. It is also desirable to have a function of resetting its forced stop state. These functions are collectively called a fault function.

However, there are conventionally two types of optical transceivers: a type of having no fault function, and a type of having a fault function. Which type of optical transceiver to use depends on communication device specifications. Accordingly, manufacturing makers (or distributors) of optical transceivers must prepare shipment for both types of optical transceivers at any time according to demands of customers (sites where communication devices are used).

To ensure that optical transceivers are reduced in size, on the other hand, a circuit for driving a laser is integrated in one IC in the optical transceiver, and a circuit for a fault function (hereinafter, "fault circuit") also in the same IC. In other words, a circuit for driving a laser element, and a fault circuit for detecting a fault in that laser element are incorporated in a laser driver IC.

As shown in FIG. 1, a fault circuit in a conventional laser driver IC comprises an RS flip-flop 1 for latching a signal that indicates an event of fault detection, to output it as an internal fault signal, and a TTL open-collector type buffer 11 for converting that internal fault signal into a fault signal outside the laser driver IC.

The RS flip-flop 1 has an S-input terminal for inputting a set signal, an R-input terminal for inputting a reset signal, a Q-output terminal for outputting a non-inversion logic, and a Q-bar output terminal for outputting an inversion logic. Input into the S-input terminal is a signal that indicates an event of fault detection. That is, although not illustrated, there are provided a monitor PD (photodiode) facing toward the light-emitting element, and a diagnosis circuit for analyzing an output signal of that monitor PD to diagnose a fault in the light-emitting element, to input an output of that diagnosis circuit directly or indirectly into the S-input terminal. Input directly or indirectly into the R-input terminal is a reset signal from outside the laser driver IC. The Q-output terminal is connected to other circuits not illustrated within the laser driver IC. In these other circuits, an output of the Q-output terminal is used as a disable signal (output #21) for inactivating the driving function of the laser driver IC. The Q-bar output terminal is connected to an input terminal of the buffer 11. The output terminal of the buffer 11 is connected to a fault signal output terminal 12 linked to outside the laser driver IC. Outside the laser driver IC, by adding a pull-up resistor not illustrated, an output of the fault signal output terminal 12 is used as a fault signal (output #22). Accordingly, a fault signal appearing at this fault signal output terminal 12 can be taken out from outside the laser driver IC (inside the optical transceiver) not illustrated. Inside the optical transceiver, this fault signal is conducted directly or indirectly to an external fault signal output terminal (not illustrated), to take an external fault signal indicating a fault to outside the optical transceiver (to a communication device) (See Japanese patent application laid-open No.9-321386).

Table 1 shows a truth table for the circuit of FIG. 1.

TABLE 1

| S | R | Q | #21 | #22 |
|---|---|---|---|---|
| H | L | H | H | H |
| L | H | L | L | L |
| H | H | Unknown | Unknown | Unknown |
| L | L | Preceding state held | Preceding state held | Preceding state held |

In Table 1, the states of the S-input terminal are shown in the S-column, the states of the R-input terminal in the R-column, the states of the Q-output terminal in the Q-column, the states of the disable signal in the output #21 column, and the states of the fault signal in the output #22 column, while the state of each signal at the same time is shown for each row, where state H denotes a high voltage level, and state L a low voltage level.

As mentioned above, since conventional optical transceivers are classified into those having no fault function, and those having a fault function, communication devices are also divided into those with specifications presupposing that optical transceivers have no fault function, and those with specifications presupposing that optical transceivers have a fault function. For this reason, when manufacturing makers or distributors of optical transceivers make optical transceivers of separate types, they need to select laser driver ICs that match their specifications. If the same laser driver IC can be used regardless of the presence/absence of a fault function of optical transceivers, stock can be saved, while operation efficiency of manufacturing lines is enhanced. To aggregate parts inside an optical transceiver, it is preferred to place the parts in its laser driver IC as much as possible. Further, even if the function of the laser driver IC is increased to ensure the above-mentioned use for both types of optical transceivers, it is preferred not to increase the number of terminals of the laser driver IC from the point of view of aggregating parts.

Here, specifications are classified, dependent on whether a disable state is produced and on whether a fault signal is output, when a light-emitting element and/or a circuit for driving that light-emitting element malfunctions.

TABLE 2

| | Disable state | Fault signal output |
|---|---|---|
| First specifications | Y | Y |
| Second specifications | Y | N |
| Third specifications | N | Y |
| Fourth specifications | N | N |

Table 2 shows the presence/absence of the disable state and fault signal output, where the presence of the disable state and fault signal output is denoted by letter "Y", and the absence thereof is denoted by letter "N". According to combinations of the presence and absence of the disable state and fault signal output, four kinds of specifications are considered, as shown in table 2. The first specifications are that both the disable state and fault signal output are obtained when a light-emitting element and/or a circuit for driving that light-emitting element malfunctions. The second specifications are that only the disable state is obtained and no fault signal output obtained when a light-emitting element and/or a circuit for driving that light-emitting element malfunctions. The third specifications are that only the fault signal output is obtained and no disable state obtained when a light-emitting element and/or a circuit for driving that light-emitting element malfunctions. The fourth specifications are that neither the disable state nor fault signal output is obtained when a light-emitting element and/or a circuit for driving that light-emitting element malfunctions.

The first and second specifications can both be realized by conventional optical transceivers such as those described above. That is because the second specifications are achieved unless output #22 of the optical transceiver is taken to outside the optical transceiver. However, the fourth specifications cannot be realized. This is because disable signals appear inside the laser driver IC. The conventional laser driver IC cannot be used in the fourth specifications, since it generates disable signals inside the IC.

For this reason, difficulty arises in meeting a variety of customers' specifications, using the same laser driver IC and without increasing the number of terminals.

SUMMARY OF THE INVENTION

It is an object of the present invention to provide a laser driver IC capable of obviating the above problems and meeting a variety of specifications without increasing the number of terminals, and an optical transceiver using the laser driver IC.

According to one aspect of the present invention, a laser driver IC comprises:

a drive circuit for driving a laser element;

a detection circuit for detecting faults in the laser element and the drive circuit;

an RS flip-flop for latching a signal that indicates an event of fault detection, to output the signal as an internal fault signal; and a fault signal processing section for generating a disable signal for inactivating the drive circuit in response to output of the RS flip-flop, wherein one of outputs of the fault signal processing section is connected to a fault signal output terminal linked to outside the laser driver IC.

The above fault signal processing section may comprise:

a switching element connected to a Q-output terminal of the RS flip-flop so that it opens and closes in response to the internal fault signal;

a resistor provided between an output of the switching element and an internal power supply; and an inverter connected to the output of the switching element, wherein an output signal of the inverter is the disable signal for inactivating the driving means; and the output of the switching element is connected to the fault signal output terminal linked to outside the laser driver IC.

According to another aspect of the present invention, an optical transceiver comprises:

a laser element; and a laser driver IC comprising a drive circuit for driving the laser element; a detection circuit for detecting faults in the laser element and the drive circuit; an RS flip-flop for latching a signal that indicates an event of fault detection, to output the signal as an internal fault signal; and a fault signal processing section for generating a disable signal for inactivating the drive circuit in response to output of the RS flip-flop, wherein one of outputs of the fault signal processing section is connected to a fault signal output terminal linked to outside the laser driver IC;

a resistor is inserted/detached between the fault signal output terminal of the laser driver IC and ground;

an input terminal of an inverter is connected to the fault signal output terminal; and an output terminal of the inverter is connected to an external fault signal output terminal linked to outside the optical transceiver.

The present invention can exhibit the excellent effect of being capable of meeting a variety of specifications without increasing the number of terminals.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
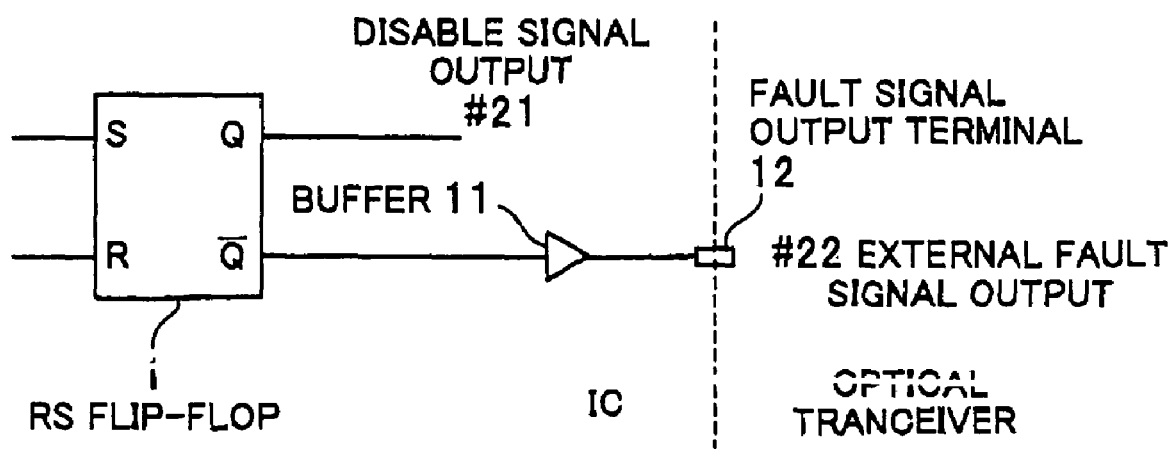
FIG. 1 is a circuit diagram of a fault circuit in a conventional laser driver IC.
Figure 2:
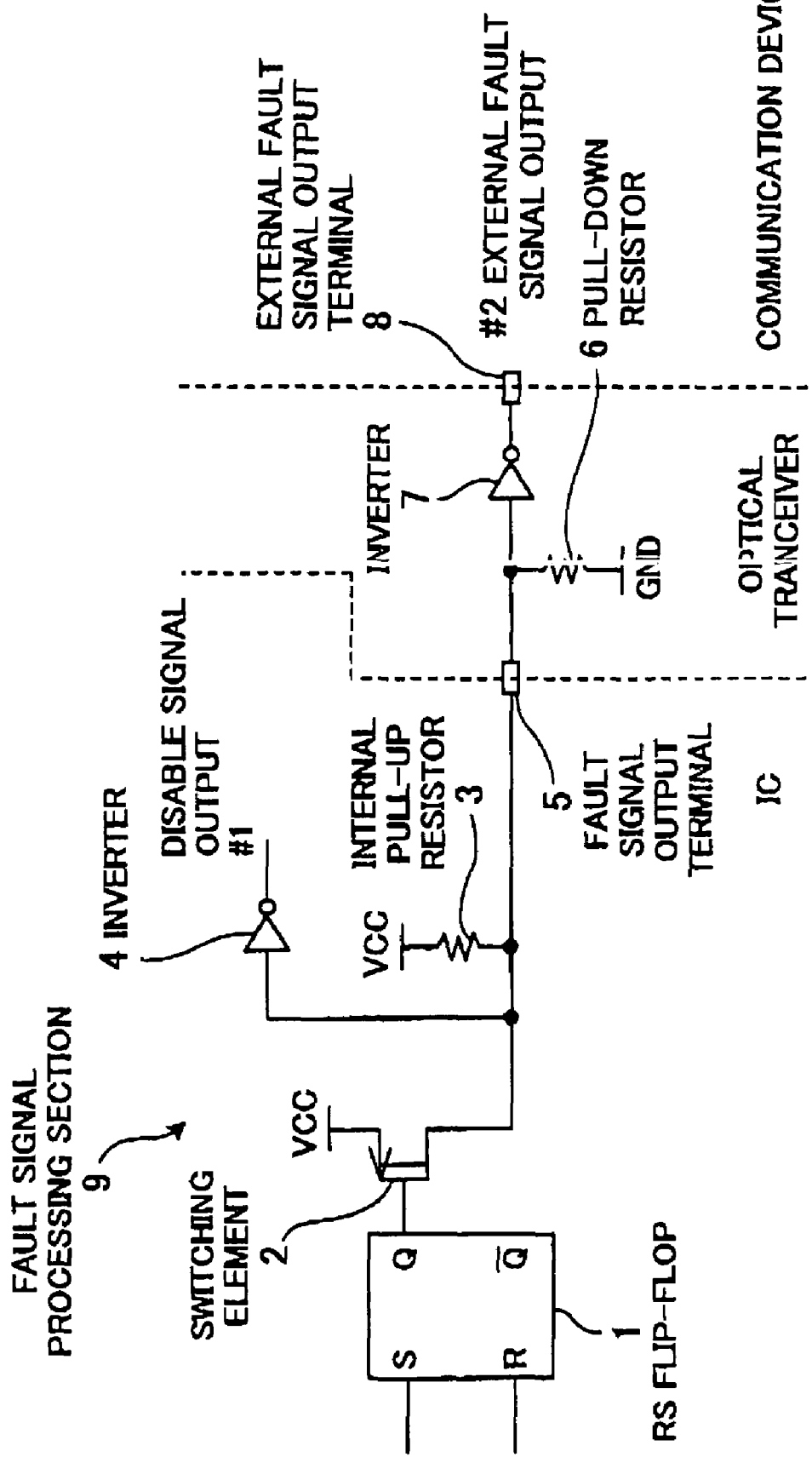
FIG. 2 is a circuit diagram of a fault circuit in a laser driver IC illustrating one embodiment of the invention.

FIG. 2 illustrates a fault circuit in a laser driver IC according to the present invention. This fault circuit in the laser driver IC includes an RS flip-flop 1 for latching a signal that indicates an event of fault detection, to output it as an internal fault signal. A Q-output terminal of the RS flip-flop 1 is connected to a gate of a switching element 2 (a PMOS transistor used in this embodiment) which opens and closes in response to the internal fault signal. An internal pull-up resistor 3 is provided between a drain of the switching element 2 and an internal power supply (VCC). The drain is also connected to an input terminal of an inverter 4 whose output signal is a disable signal (output #1) for inactivating the driving function for a laser element not shown. The drain is further connected to a fault signal output terminal 5 linked to outside the laser driver IC. Inside the optical transceiver outside the laser driver IC, a pull-down resistor 6 is inserted/detached between the fault signal output terminal 5 of the laser driver IC and ground GND. The fault signal output terminal 5 is connected to an input terminal of a TTL open-collector type inverter 7 whose output terminal is connected to an external fault signal output terminal 8 linked to outside the optical transceiver. The output terminal of the inverter 7 is the open collector. Signals appearing at the external fault signal output terminal 8 is an external fault signal (output #2) for indicating a fault to outside the optical transceiver (to a communication device). It should be noted that, inside the communication device outside the external fault signal output terminal 8, the collector of the inverter 7 is connected to a pull-up resistor (not illustrated).

In the circuit of FIG. 2, the switching element 2, internal pull-up resistor 3 and inverter 4 constitute a fault signal processing section 9. This fault signal processing section 9 generates a disable signal for inactivating the driving function of the laser driver IC in response to the Q-output of the RS flip-flop 1, and one of outputs of the fault signal processing section 9 is connected to the fault signal output terminal 5 linked to outside the laser driver IC.

The RS flip-flop 1 may be the same as the conventional RS flip-flop. The present invention uses only signals at the Q-output terminal of the RS flip-flop 1, but does not use signals at the Q-bar output terminal. A source of the switching element 2 is connected directly to the internal power supply. Inside the laser driver IC, conduction takes place between the drain of the switching element 2 and one end of the internal pull-up resistor 3, the input terminal of the inverter 4 and the fault signal output terminal 5. Inside the optical transceiver, conduction takes place between the fault signal output terminal 5 of the laser driver IC and one end of the pull-down resistor 6 and the input terminal of the inverter 7.

The resistance B of the pull-down resistor 6 is sufficiently small, compared to the resistance A of the internal pull-up resistor 3, i.e., A>>B.

As concrete methods for inserting/detaching the pull-down resistor 6, there are the methods: by attaching a resistive element with a lead beforehand and cutting the lead afterward to remove the resistive element; by attaching a resistive element, not beforehand but afterward, to a wiring pattern for resistive element attaching; by providing a cuttable/connectable wiring pattern between the fault signal output terminal 5 and resistive element; by using a jumper socket to connect that wiring pattern, and so on.

The operation of the circuit of FIG. 2 is explained next.

Now, as in FIG. 2, when the pull-down resistor 6 is mounted, the potential at the fault signal output terminal 5 is determined by the state of the switching element 2. When the switching element 2 turns ON, conduction takes place between its drain and the internal power supply, so that the potential at the fault signal output terminal 5 is equal to the internal power supply such that it is at an H-level. When the switching element 2 turns OFF, voltage is divided between the internal pull-up resistor 3 and the pull-down resistor 6, so that the potential at the fault signal output terminal 5 is sufficiently lower than threshold in logic determination such that it is at an L-level. The state of the switching element 2 is uniquely determined by the state of the Q-output of the RS flip-flop 1. In other words, when its gate is at an H-level, the switching element 2 turns OFF, while when its gate is at an L-level, the switching element 2 turns ON. From this, the truth table for this circuit is shown in Table 3.

TABLE 3

| S | R | Q | #1 | #2 |
|---|---|---|---|---|
| H | L | H | H | H |
| L | H | L | L | L |
| H | H | Unknown | Unknown | Unknown |
| L | L | Preceding state held | Preceding state held | Preceding state held |

As shown in Table 3, when the S-input terminal is at an H-level (detecting a fault) and the R-input terminal is at an L-level (not reset), the Q-output terminal is at an H-level, while the disable signal (output #1) and external fault signal (output #2) are both at an H-level (forcing the drive circuit to stop and indicating the fault). Conversely, when the S-input terminal is at an L-level (detecting no fault) and the R-input terminal is at an H-level (reset), the Q-output terminal is at an L-level, while the disable signal (output #1) and external fault signal (output #2) are both at an L-level (continuing operation of the drive circuit and indicating no fault). It should be noted that when an incoming signal into the R-input terminal comes from outside the optical transceiver and the drive circuit is forced to stop by that external signal, it is preferred to take OR of the incoming signal into the R-input terminal and disable signal (output #1). In this case, of course, because of no fault, the external fault signal (output #2) is at an L-level. When the S- and R-input terminals are both at an H-level, the state of the Q-output terminal is unknown, which is however no problem because that input state is impossible to occur in an input circuit (not illustrated) into the S- and R- input terminals. When the S- and R-input terminals are both at an L-level, the Q-output terminal holds the preceding state, which therefore results in no change of the disable signal and external fault signal.

From this truth table, the disable signal and external fault signal are both at an H-level for events of fault detection. That is, the first specifications shown in table 2 are realized. In this case, if no port for inputting the external fault signal exists inside the communication device outside the external fault signal output terminal 8, which is the same as the case of no external fault signal, the second specifications are therefore realized.

Next, the pull-down resistor 6 is detached from (not mounted to, disconnected from, etc.) the fault circuit. Because of no member for conducting current to ground from the fault signal output terminal 5, the potential at the fault signal output terminal 5 is unaffected by the state of the switching element 2. Even when the switching element 2 turns OFF as well as ON, no current flows through the internal pull-up resistor 3, so that the potential at the fault signal output terminal 5 is equal to the internal power supply such that it is at an H-level. From this, the truth table for this circuit is shown in Table 4.

TABLE 4

| S | R | Q | #1 | #2 |
|---|---|---|---|---|
| H | L | H | L | L |
| L | H | L | L | L |
| H | H | Unknown | L | L |
| L | L | Preceding state held | L | L |

As shown in Table 4, when the S-input terminal is at an H-level (detecting a fault) and the R-input terminal is at an L-level (not reset), the Q-output terminal is at an H-level, while the disable signal (output #1) and external fault signal (output #2) are both at an L-level (continuing operation of the drive circuit and indicating no fault). Conversely, when the S-input terminal is at an L-level (detecting no fault) and the R-input terminal is at an H-level (reset), the Q-output terminal is at an L-level, while the disable signal (output #1) and external fault signal (output #2) are both at an L-level (continuing operation of the drive circuit and indicating no fault).

From this truth table, the disable signal and external fault signal are both at an L-level for events of fault detection. That is, the fourth specifications shown in table 2 are realized.

As above, by inserting the pull-down resistor 6, the operation shown in table 3 is obtained, which allows the first and second specifications to be realized, while by detaching the pull-down resistor 6, the operation shown in table 4 is obtained, which allows the fourth specifications to be realized. In switching these specifications, no terminal for switching signals is required in the laser driver IC, but one terminal (fault signal output terminal 5) has only to exist as in the conventional laser driver IC. Thus, a variety of specifications can be met without increasing the number of terminals.

Accordingly, an optical transceiver in which is incorporated the laser driver IC of the present invention allows the pull-down resistor 6 to be only inserted/detached according to specifications demanded from a user using a communication device. Also, because of no need of increasing the number of terminals of the laser driver IC, the laser driver IC can be made small in size.

Figure 3:
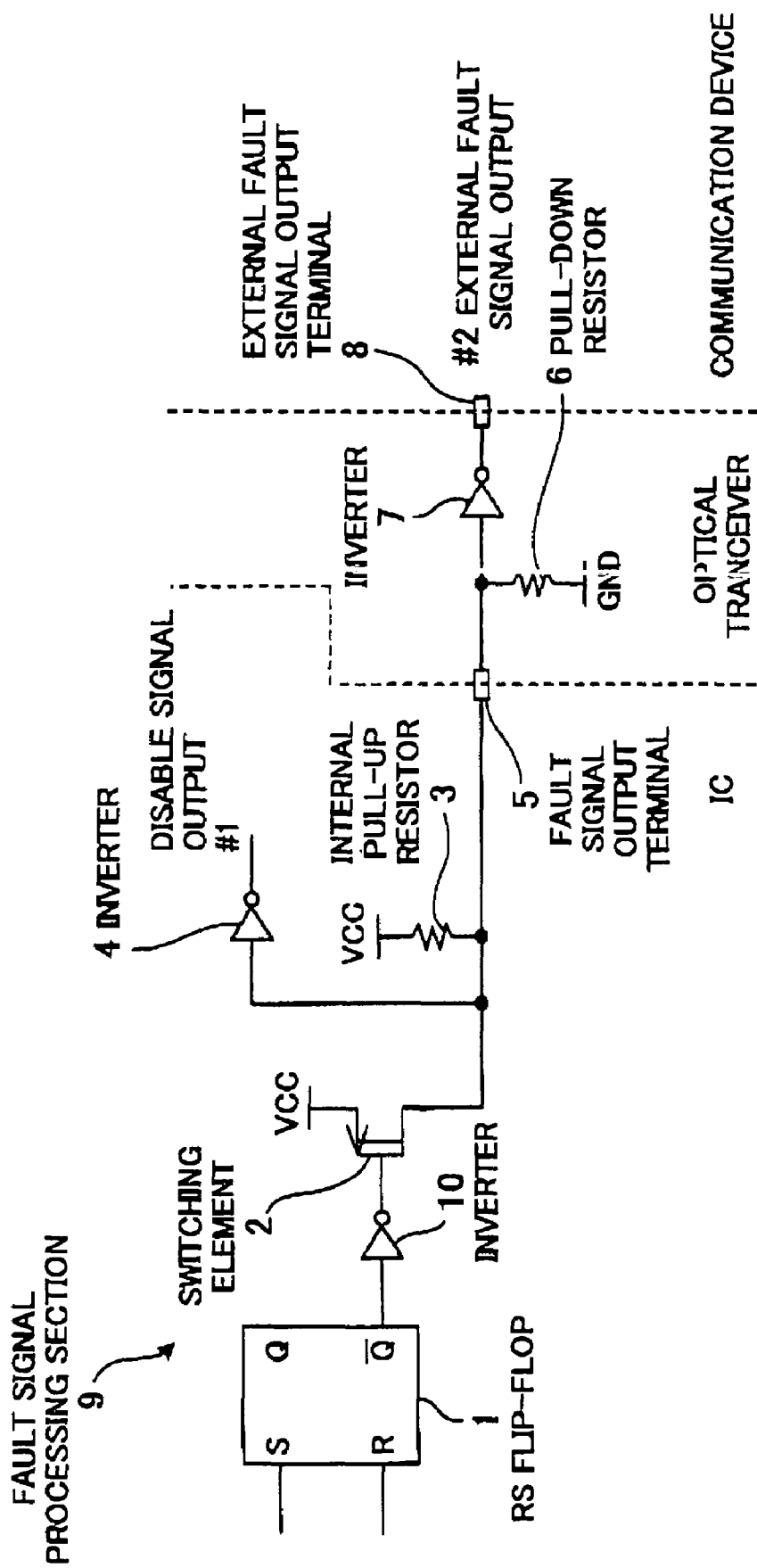
FIG. 3 is a circuit diagram of a fault circuit in a laser driver IC illustrating another embodiment of the invention.

FIG. 3 illustrates a circuit in which an inverter 10 is connected to the Q-bar output terminal of the RS flip-flop 1 of FIG. 2, and an output of the inverter 10 is connected to the gate of the switching element 2. The other portions are the same as in FIG. 2.

Since the circuit of FIG. 3 inverts Q-bar output of the RS flip-flop 1 to be input into the switching element 2, the subsequent operation of the circuit is the same as the case of FIG. 2 explained above. That is, the present invention may be configured even by use of the Q-bar output of the RS flip-flop 1.

In the circuits of FIGS. 2 and 3, the pull-down resistor 6 (or internal pull-up resistor 3) may be replaced by a constant current source without replacing the internal pull-up resistor 3 (or pull-down resistor 6).

The constant current source is a power supply whose internal resistance is very large such that it is infinite, and whose current can thereby be constant. For example, even if the load is short-circuited, its current is constant.

Figure 4:
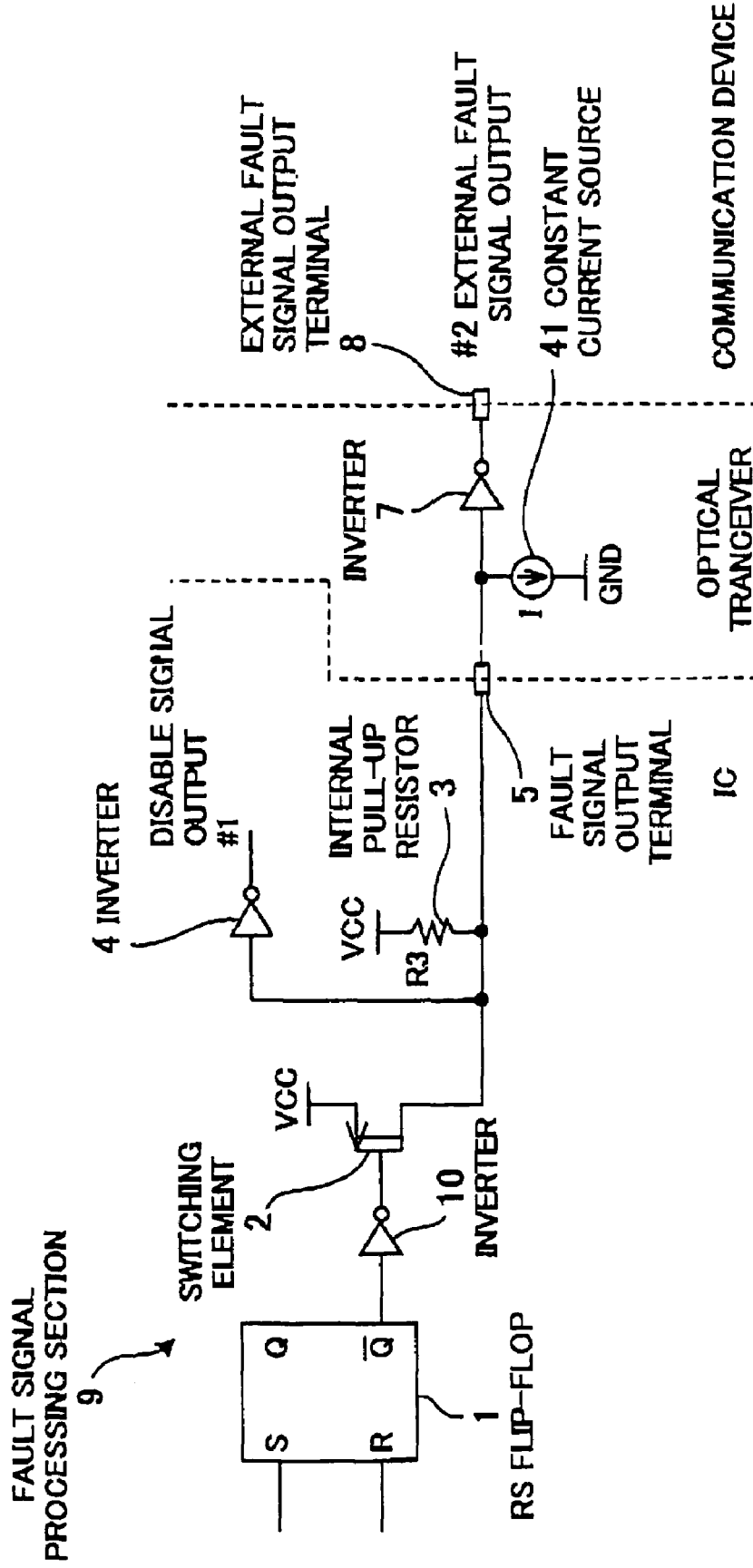
FIG. 4 is a circuit diagram of a fault circuit in a laser driver IC illustrating another embodiment of the invention.

FIG. 4 illustrates a fault circuit in a laser driver IC, in which the pull-down resistor 6 of FIG. 2 is replaced by a constant current source 41 without replacing the internal pull-up resistor 3, and where R3 is the resistance of the internal pull-up resistor 3 and I is the current of the constant current source 41.

In this circuit, when the Q-output of the RS flip-flop 1 is at an L-level, operation is the same as in the circuit of FIG. 2. When the Q-output is at an H-level, resistance R3 and current I are such that VCC−IR3=L-level. In other words, resistance R3 and current I are such that external fault signal #2 is at an L-level.

In the case the constant current source 41 is detached from this circuit, it is prior art.

Figure 5:
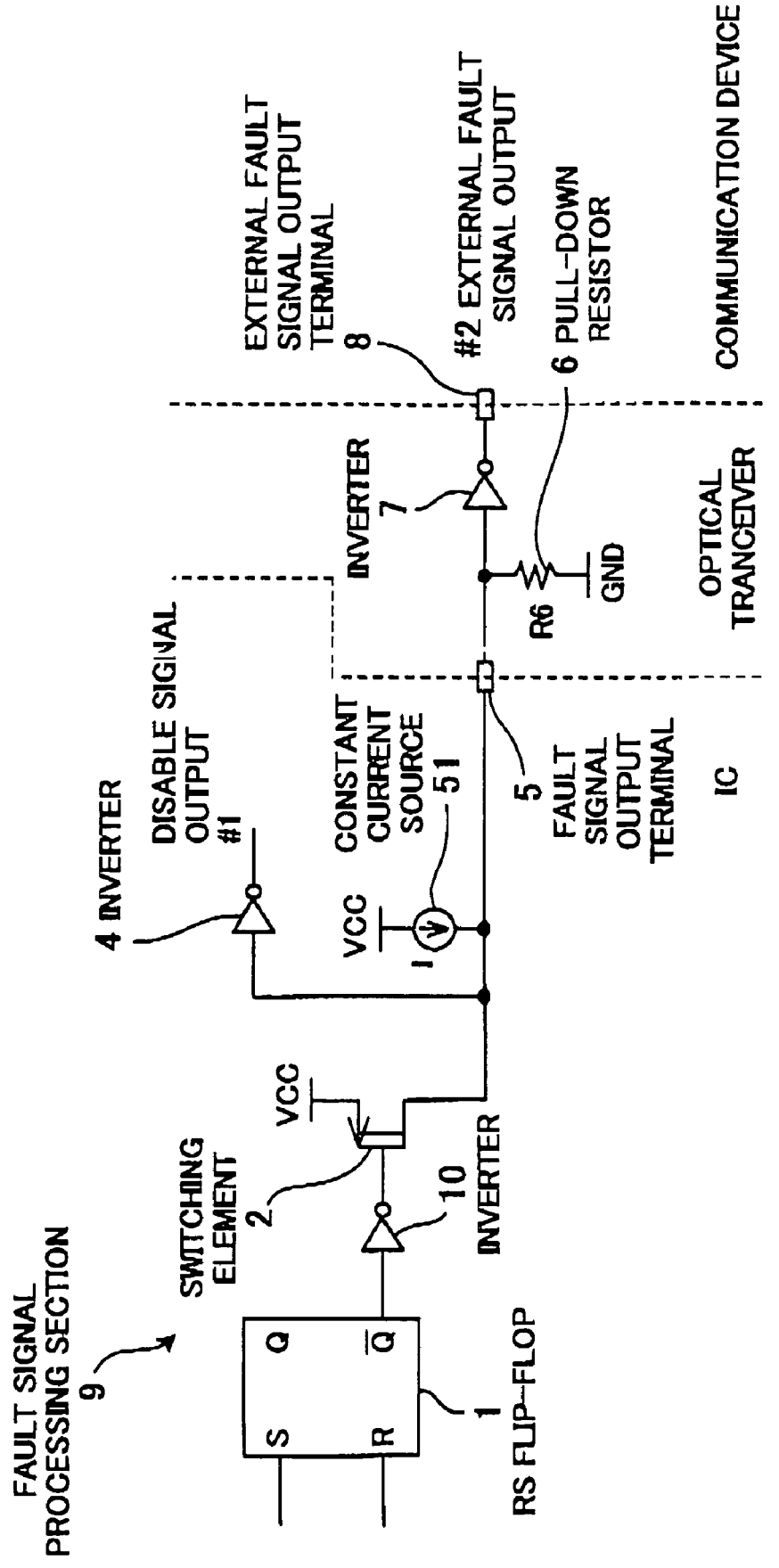
FIG. 5 is a circuit diagram of a fault circuit in a laser driver IC illustrating another embodiment of the invention.

FIG. 5 illustrates a fault circuit in a laser driver IC, in which the internal pull-up resistor 3 of FIG. 2 is replaced by a constant current source 51 without replacing the pull-down resistor 6, and where R6 is the resistance of the pull-down resistor 6 and I is the current of the constant current source 51.

In this circuit, when the Q-output of the RS flip-flop 1 is at an L-level, operation is the same as in the circuit of FIG. 2. When the Q-output is at an H-level, resistance R6 and current I are such that VCC−IR6=L-level. In other words, resistance R6 and current I are such that external fault signal #2 is at an L-level.

In the case the pull-down resistor 6 is detached from this circuit, when the Q-output is at an L-level, external fault signal #2 is at an L-level. When the Q-output is at an H-level, because of no portion through which current I flows, external fault signal #2 is at an L-level.

The merit of using the constant current source as in the circuits of FIGS. 4 and 5 is that stable current can be obtained substantially without being affected by the load.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transceiver, comprising:
a laser element; and
a laser driver IC comprising:
 a drive circuit for driving the laser element;
 a detection circuit for detecting faults in the laser element and the drive circuit;
 an RS flip-flop for latching a signal that indicates an event of fault detection, to output the signal as an internal fault signal; and
 a fault signal processing section for generating a disable signal for inactivating the drive circuit in response to output of the RS flip-flop,
wherein one of outputs of the fault signal processing section is connected to a fault signal output terminal linked to outside the laser driver IC;
a resistance component is configured to be selectively attached to/detached from between the fault signal output terminal of the laser driver IC and ground provided outside the laser driver IC;
an input terminal of an inverter is connected to the fault signal output terminal; and
an output terminal of the inverter is connected to an external fault signal output terminal linked to outside the optical transceiver,
wherein one of the selectively attaching/detaching the resistance component allows the disable signal to be generated and another of the selectively attaching/detaching the resistance component prevents the disable signal from being generated, and
wherein when the resistance component is selectively detached from between the fault signal output terminal of the laser driver IC and ground provided outside the laser driver IC, a potential of the fault signal output terminal is equal to a portion of an internal power supply.

2. The optical transceiver according to claim 1, wherein:
the resistance component comprises a resistor.

3. The optical transceiver according to claim 1, wherein:
the resistance component comprises a constant current source.

4. The optical transceiver according to claim 1, further comprising:
the fault signal processing section comprising a switching element connected to a Q-output terminal of the RS flip-flop so that the switching element opens and closes in response to the internal fault signal;
a second resistor provided between an output of the switching element and an internal power supply; and
an inverter connected to the output of the switching element,
wherein an output signal of the inverter comprises the disable signal for inactivating the drive circuit; and
the output of the switching element is connected to the fault signal output terminal inked to outside the laser driver IC.

5. The optical transceiver according to claim 1, further comprising:
the fault signal processing section comprising a switching element connected to a Q-output terminal of the RS flip-flop so that the switching element opens and closes in response to the internal fault signal;

a constant current source provided between an output of the switching element and an internal power supply; and an inverter connected to the output of the switching element, wherein an output signal of the inverter comprises the disable signal for inactivating the drive circuit; and the output of the switching element is connected to the fault signal output terminal inked to outside the laser driver IC.

6. The optical transceiver according to claim 1, wherein when the resistance component is attached to between the fault signal output terminal of the laser driver IC and ground provided outside the laser driver IC, the disable signal is generated by the fault signal processing section.

7. The optical transceiver according to claim 1, wherein when the resistance component is detached from between the fault signal output terminal of the laser driver IC and ground provided outside the laser driver IC, the disable signal is not generated and the internal fault signal is not outputted.

8. The optical transceiver according to claim 1, further comprising:

an internal pull-up resistor connected to the fault signal output terminal.

9. The optical transceiver according to claim 1, further comprising:

a constant current source connected to the fault signal output terminal.

10. The optical transceiver according to claim 2, wherein:

the resistance component comprises a pull-down resistor.

* * * * *